May 31, 1955 K. M. HALEY ET AL 2,709,530
FURNACE FEEDING APPARATUS
Filed April 17, 1952 4 Sheets-Sheet 1

INVENTORS
KENNETH M. HALEY
BY HAROLD V. TRASK
ATTORNEYS

May 31, 1955

K. M. HALEY ET AL 2,709,530

FURNACE FEEDING APPARATUS

Filed April 17, 1952

INVENTORS
KENNETH M. HALEY
HAROLD V. TRASK
BY Hudson, Boughton,
Williams, David & Hoffmann
ATTORNEYS

INVENTORS
KENNETH M. HALEY
BY HAROLD V. TRASK
ATTORNEYS

INVENTORS
KENNETH M. HALEY
HAROLD V. TRASK
BY Hudson, Boughton
Williams, David & Hoffmann
ATTORNEYS United States Patent Office 2,709,530
Patented May 31, 1955

2,709,530

FURNACE FEEDING APPARATUS

Kenneth M. Haley and Harold V. Trask, Ashland, Ky., assignors to Oglebay, Norton and Company, Cleveland, Ohio, a corporation of Delaware Application April 17, 1952, Serial No. 282,878

23 Claims. (Cl. 214—18)

This invention relates to an apparatus for charging material into the top of a receptacle and, while not limited thereto, is particularly useful for charging material in the form of discrete bodies into a rectangular shaft furnace.

It is now known that many finely divided materials such as ores, ore concentrates, flue dust, and the like, either alone or mixed with fuel and other substances, may be agglomerated by forming such material or materials into discrete, substantially symmetrical bodies or pellets and then heating. This heating, when properly effected, will harden the bodies or pellets so that they may thereafter be handled by conventional ore handling equipment and constitute a suitable charge for a blast furnace or other refining apparatus. The heating must, however, be carefully controlled so that all of the pellets or bodies are subjected to substantially the same temperatures for substantially the same periods of time.

In the copending U. S. patent application of Kenneth M. Haley et al., Ser. No. 256,908, filed November 17, 1951, there is disclosed a temperature control for a shaft furnace in which the above-mentioned heating for indurating of the aggregates or pellets may be readily effected. In such a furnace the discharge of the hardened pellets or aggregates is effected at the bottom of the furnace at a substantially uniform rate throughout the cross-sectional area thereof so that the material in any transverse plane moves downwardly within the furnace at substantially the same rate, thereby insuring that each pellet or body thereof will be subjected to substantially the same amount of heat in its movement through the furnace. It is, therefore, essential that the material being treated be charged into the top of the furnace at a substantially uniform rate throughout the cross-sectional area thereof. Moreover, provision should be made for altering the charging so that any voids or other irregularities that may occur in the top surface of the material may be corrected.

Similar requirements and problems are encountered with material receptacles other than shaft furnaces in which material is supplied to the top thereof, to replace that withdrawn from a point adjacent the bottom, and where it is desired to maintain a substantially uniform predetermined amount of material in the receptacle. Consequently, while reference has been made and will hereinafter be made to charging a shaft furnace with material in the form of discrete bodies, and while the present preferred embodiment of the invention is particularly designed for such a use, it is to be understood that the invention is not limited to charging a shaft furnace with pellets or discrete bodies of ore, ore concentrates, or the like, but may be utilized wherever similar problems arise.

An object of the invention is to provide an improved apparatus for charging material into the top of a shaft furnace or other receptacle, the said apparatus including a first conveyor means reciprocating over the top of the receptacle and a second conveyor means extending transversely thereto and supported for movement with the first-mentioned conveyor means adjacent the discharge end of the latter to receive material therefrom, the width and speed of the second-mentioned conveyor means being insufficient to retain thereon all of the material delivered thereto by the first-mentioned conveyor means so that a portion of the material falls from the sides of the second-mentioned conveyor means into the central portion of the receptacle while the remainder is deposited adjacent opposite side walls of the receptacle.

Another object of the invention is to provide an apparatus of the type referred to in the preceding paragraph and in which the second-mentioned conveyor means has openings therethrough permitting passage of bodies of the material smaller than a predetermined size.

A further object of the invention is to provide an improved apparatus for charging material into the top of a shaft furnace or other receptacle as defined above and in which the second-mentioned conveyor means is driven by a reversible power means with a means being provided to control the said power means in a manner to provide operation of the second-mentioned conveying means alternately in opposite directions for time intervals of preselected duration.

An additional object of the invention is to provide an improved apparatus for charging material into the top of a furnace such that the material is delivered thereto and substantially uniformly distributed therein while the top of the furnace is maintained substantially closed, thus conserving heat and reducing dust losses.

A still more specific object of the invention is the provision of an apparatus for charging material, a major portion of which is in the form of discrete bodies, into the top of a furnace while maintaining the top of the furnace substantially closed, the said apparatus including a cover member and conveyor connected for reciprocation together over the furnace with a material depositing space between the cover and conveyor, and a second conveyor extending transversely of the cover member and first conveyor at the space therebetween and reversibly driven to receive and distribute the material delivered by the first conveyor, the said second conveyor having openings therethrough, for passage of bodies of the material smaller than a predetermined size, and a width less than sufficient to carry all of the material deposited by the first conveyor, whereby the material is progressively delivered to all parts of the cross sectional area of the furnace by reciprocation of the cover member and conveyors.

Another object of the invention is to provide an improved apparatus for charging material into the top of a receptacle, which apparatus includes a power-driven belt conveyor bodily reciprocated over the receptacle and beneath a source of supply of material with means to automatically alter the speed of the conveyor when its direction of reciprocation is reversed so that the quantity of material delivered to the receptacle by the conveyor is substantially uniform regardless of its direction of movement over the receptacle.

The invention further resides in certain novel features of the construction and in the combination and arrangements of parts of the apparatus, and further objects and advantages thereof will be apparent to those skilled in the art to which the invention pertains from the following description of the present preferred embodiment thereof, described with reference to the accompanying drawings, in which.

Figure 1:
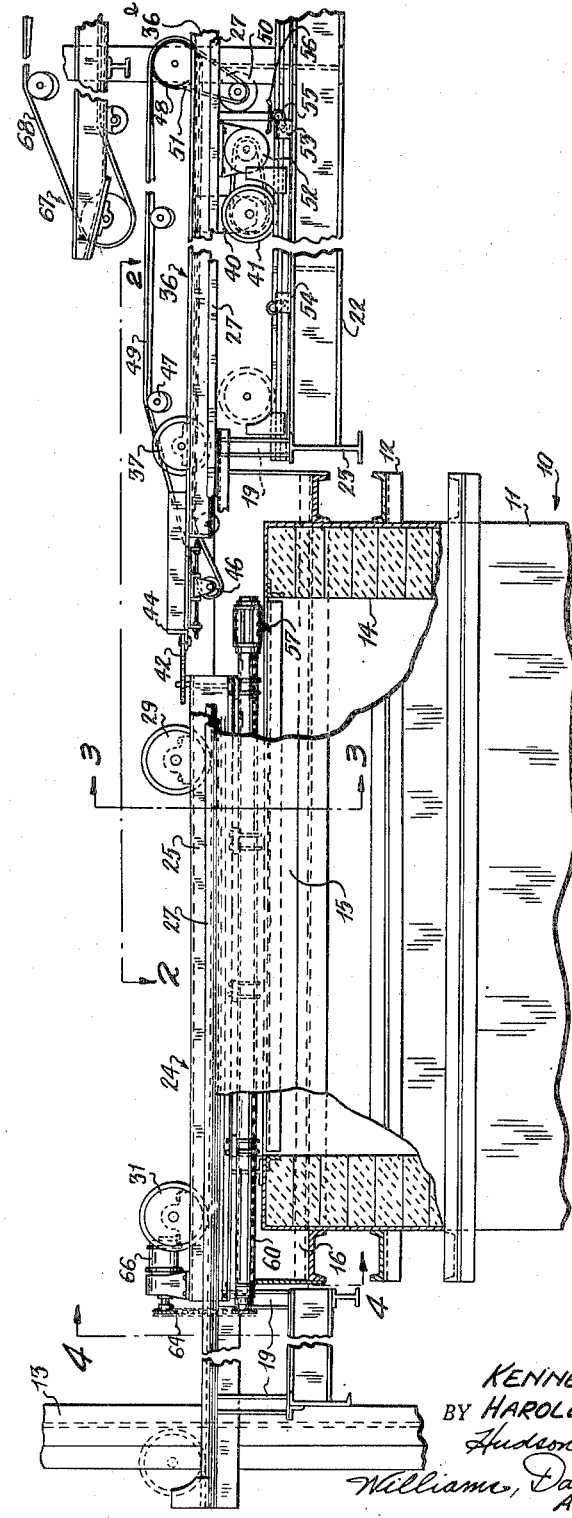
Fig. 1 is a side view of an apparatus constructed in accordance with this invention and adapted for charging a rectangular shaft furnace, the view being principally in elevation with certain parts being broken away and others shown in section for the sake of clarity of disclosure.

For the sake of simplicity and clarity of disclosure, the invention is illustrated as embodied in an apparatus for charging material, a major portion of which is in the form of discrete bodies, into the top of a shaft furnace having a rectangular cross section. The furnace per se forms no part of this invention and for the purposes of the present disclosure, it is sufficient to note that such a furnace, designated generally 10, constitutes a receptacle into which the material is charged at the top, and, after moving downwardly therethrough, is finally discharged from the bottom by a means not shown. The proper operation of the furnace, especially when the material comprises substantially symmetrical pellets or agglomerates containing iron ore concentrates or the like, normally requires a substantially uniform distribution of the material with a slightly higher level of material adjacent the side walls than in the center of the furnace. It is, however, desirable to be able to distribute the material in other arrangements or patterns to thereby control the furnace operation and the flow of gases therethrough. By way of example, it has been found desirable to normally distribute any fines, from broken aggregates or pellets, substantially uniformly across the top surface of the material in the furnace along with a portion of the unbroken pellets or aggregates while the remainder of the latter are disposed adjacent the side walls of the furnace, and to an elevation higher than that of the material in the central portion of the furnace. During normal operation of the furnace, this distribution of material should be substantially automatically effected but provision should be made for permitting variation in the feeding distribution or pattern to correct abnormal conditions of furnace operation. The apparatus of this invention is capable of fulfilling these requirements thus providing improved furnace operation as the result of better distribution of material therein. Likewise, the novel features of this invention may be employed to provide improved charging of materials into receptacles other than shaft furnaces where similar problems are encountered.

As mentioned heretofore, the furnace or receptacle being charged does not constitute a part of this invention and hence will not be described in detail. It is sufficient here to note that the furnace shown is substantially rectangular in cross section and is formed of a metallic outer shell 11 reinforced with suitable braces or supporting members 12 and vertically extending columns 13. The interior of the furnace, at least the part subjected to elevated temperatures, is lined with fire brick or other refractory material 14 and the top of the furnace is provided, adjacent either side thereof with a means for collecting and exhausting the gases and any dust issuing from the furnace, the top of the furnace being normally substantially covered as hereinafter described. As shown in the drawings this exhausting means comprise separate elongated chambers 15 and 16 adjacent either side of the furnace extending along the greatest dimension thereof and slightly beyond its end walls. These chambers have openings in the sides thereof adjacent the top of the furnace and are connected with an exhaust fan, not shown, for withdrawing the gases and any dust which may be created in the operation.

Supported upon the top of the exhaust chambers are rails 17 and 18, one on each side of the furnace and extending in parallel relationship therewith, thereby providing a trackway for supporting and guiding the combined furnace cover and material distributing mechanism of this invention in its reciprocating movements over the furnace top. The rails 17 and 18 extend beyond the ends of the furnace and of the exhausting means and these outer portions of the rails are suitably supported upon structural members by means of brackets or columns such as 19. Beyond one end wall of the furnace 10 are a second pair of rails 20, 21 which extend parallel with the rails 17, 18 but spaced outwardly therefrom and at a lower elevation. This second pair of rails is suitably supported by structural members, such as 22, 23, and provides a trackway or support for a reciprocating mechanism.

Figure 3:
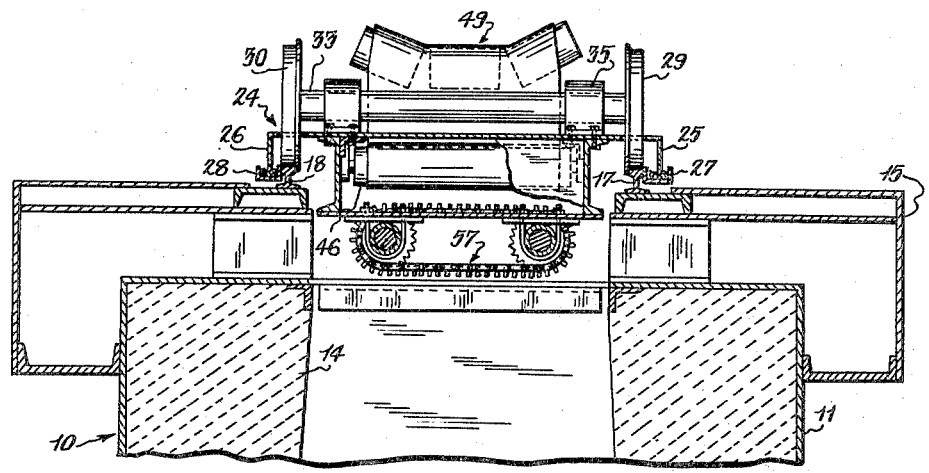
Fig. 3 is a fragmentary sectional view taken substantially on the line 3—3 of Fig. 1.
Figure 4:
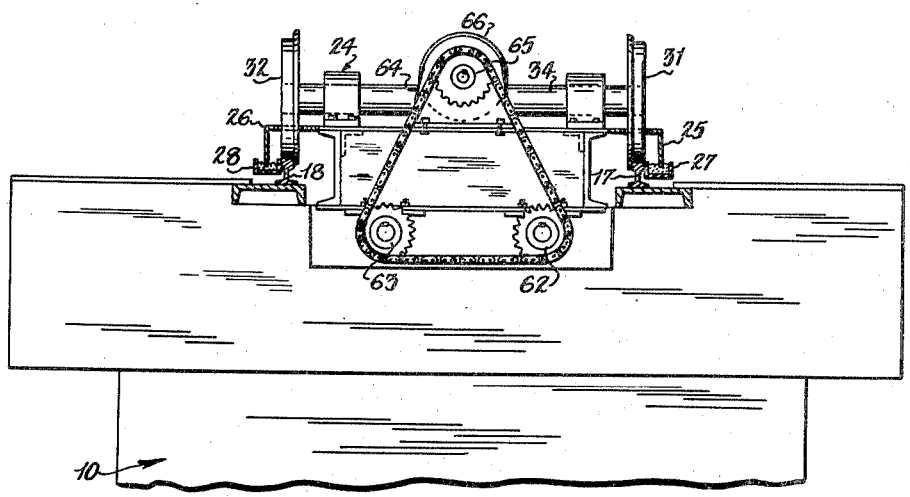
Fig. 4 is a fragmentary sectional view taken substantially on the lines 4—4 of Fig. 1.

As mentioned heretofore, the reciprocating mechanism comprises both a cover member and a conveying means. The cover member 24 is substantially rectangular in configuration and is formed of suitable structural steel members and/or plates bolted, welded, or otherwise secured together to provide an impervious body of dimensions such as to extend over the major portion of the top opening of the furnace when the apparatus is in the position indicated in Fig. 1. As shown in Figs. 3 and 4, the cover member 24 fits between the upper edges of the structures providing the aforementioned chambers or hoods 15 and 16 with the lower surface of the member adjacent the entrances to these chambers. Consequently, the cover member 24 serves to prevent free escape of air, gases, or dust from the furnace and directs these substances into the exhaust hoods or chambers 15, 16. To further facilitate this directing of the gas, dust, and the like into the exhaust chambers, the cover member 24 is preferably provided with outwardly and downwardly extending flange-like portions 25, 26, the lower edges of which run in water provided in troughs 27, 28 extending longitudinally of the furnace adjacent the outer sides of the rails 17, 18. There is thus provided a water seal between the longitudinal edges of the cover member and the exhaust hoods or chambers 15, 16 which is maintained during reciprocation of the apparatus.

The cover member 24 is supported for reciprocation along the rails 17, 18 by spaced pairs of flanged wheels 29, 30 and 31, 32. These wheels are provided on the outer ends of axles 33 and 34 which are mounted upon the upper side of the cover member by suitable bearings 35 and the previously mentioned longitudinally extending flanges or extensions 25, 26 of the cover member have openings for receiving the aforementioned wheels so that the latter may engage the rails 17, 18. This construction protects the axles and bearings from the heat and dust of the furnace. This protective feature can be increased and escape of dust or gas further reduced by providing the rails 17, 18 and wheels 29, 30, 31 and 32 externally of the depending flanges 25 and 26.

In addition to the cover member 24, the reciprocating mechanism includes a conveyor means extending in longitudinal alignment with the cover member and connected for movement therewith in spaced relationship thereto. In the illustrated embodiment, this conveyor means comprises a framework or support, generally designated 36, formed of structural steel members or the like welded, bolted or otherwise connected together in a substantially rectangular configuration. The forward portion of this framework 36 is provided with a pair of flanged wheels 37 and 38 which run upon the same rails 17 and 18 as do the wheels 29, 30, 31 and 32 of the cover member. The rear portion of the framework 36 is supported by means of depending brackets or support members, such as 40, which are provided with a transversely extending axle having spaced flanged wheels, such as 41, that ride upon the previously mentioned rails 20 and 21, see Fig. 1.

The cover member 24 and the frame 36 of the conveying means are releasably connected by suitable means capable of ready variation of the space therebetween. As shown in Fig. 2, this connection is effected by spaced straps 42, 43 which are each secured at one end to a transverse member 44 of the frame 36 for the conveying means and have the other end thereof provided with spaced openings for reception of bolts or pins carried by the cover member. The major portion of the frame 36 is closed by transversely extending plates, such as 36a, see Fig. 2, but the transverse member 44 is secured to the outer ends of the side members of the frame 36 in spaced relationship to the said plate or plates 36a so that an open space is thus provided at the forward end of the frame. Within this open space of the frame 36 is disposed the head pulley 46 of an endless conveyor of the belt type, this pulley being adjustably supported in a conventional manner, the details of which need not here be described, for permitting adjustment of the conveyor. The framework 36 also supports spaced rollers or guides, such as 47, and the rear pulley or drum 48 for the conveyor belt 49 is so positioned and mounted that the upper surface of the conveyor belt is troughed along its upper horizontal portion, as will be apparent from Figs. 1 and 2. The position of the head pulley 46 is such that the forward portion of the conveyor belt adjacent the cover member 24 inclines downwardly slightly. Driving of the conveyor 49 is effected by means of an electric motor and speed reduction unit 50 which are supported on the framework 36 and connected with the pulley 48 by a suitable chain or belt drive 51.

Reciprocation of the cover member 24 and conveyor 49 is effected by means of an electric motor of the reversible type connected through a suitable speed reduction unit to one of the wheels 41 upon the conveyor framework 36. This motor and speed reduction unit, generally designated 52, is preferably mounted upon the lower side of framework 36, as shown in Fig. 2, and is automatically controlled by suitable electrical means, as hereinafter described in detail. For the present it is sufficient to note that this control includes spaced electrical limit switches 53 and 54 mounted adjacent the rail 20 and each provided with an operating arm having a roller 55 adjacent the outer end which is adapted to be engaged and moved by an actuating member 56 carried by the framework 36 for the conveyor as the latter moves forwardly and rearwardly in its operation.

Figure 2:
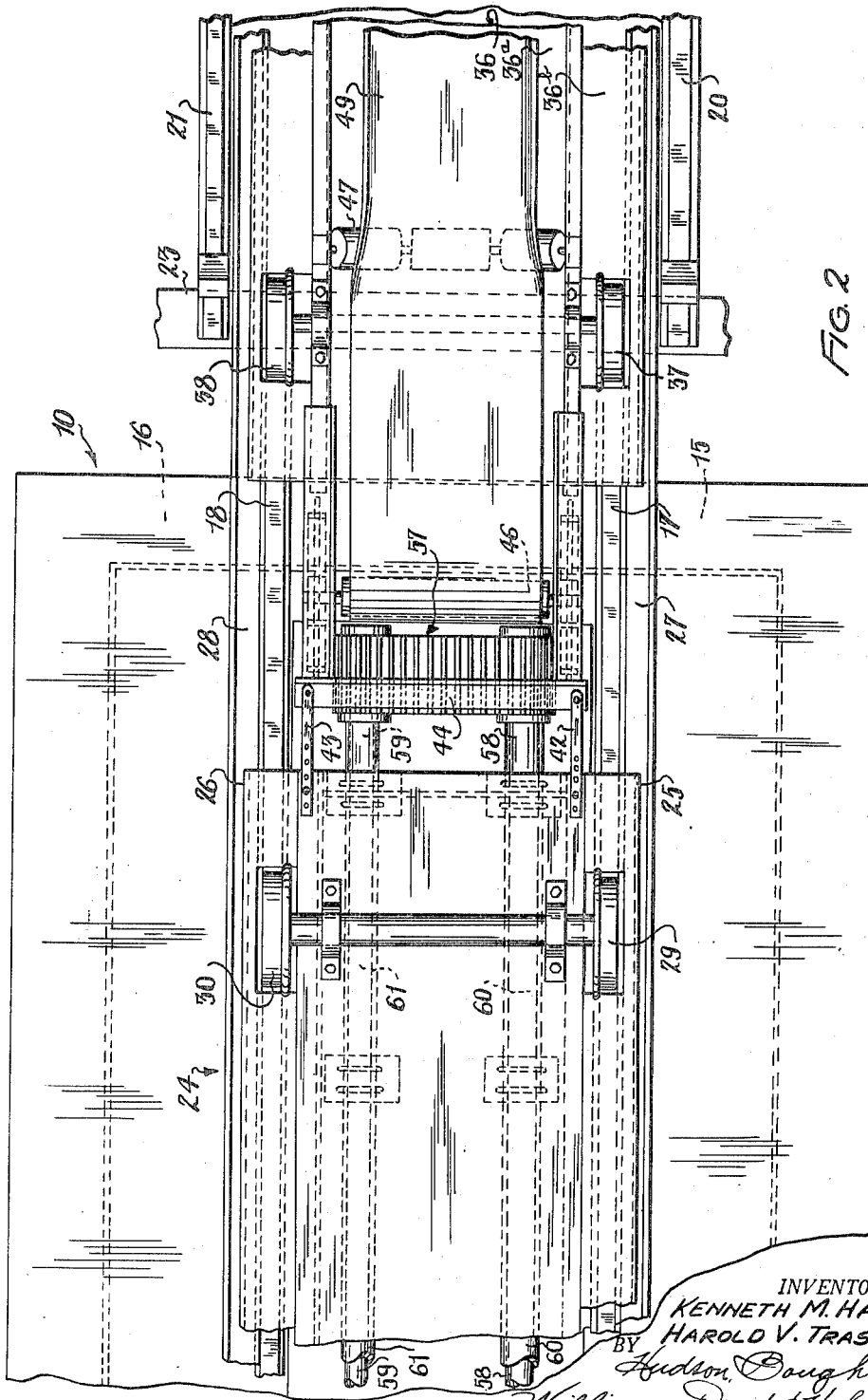
Fig. 2 is a fragmentary top plan view of the apparatus illustrated in Fig. 1 but to an enlarged scale, the view being taken substantially as indicated by the line 2—2 in Fig. 1.

In the position of the parts shown in Fig. 1, the mechanism has reached substantially its maximum position in the rearward or right-hand direction of movement and is about to be reversed for forward travel over the furnace. At this time, it will be observed that the actuating member 56 is in engagement with the roller 55 of limit switch 53 actuating the latter and that the forward end of the conveyor belt 49 is adjacent the side wall of the furnace with the cover member 24 extending substantially over the entire top of the furnace except for a transverse opening or slot adjacent and between the edge of the cover member and the head pulley 46 of the conveyor. Consequently, material carried by the conveyor 49 is delivered from the forward or delivery portion thereof into the furnace adjacent one end wall thereof and, as the mechanism is now moved forwardly over the furnace, this material will be distributed therein longitudinally of the furnace since the width of the conveyor belt 49 is only slightly less than the width of the furnace. During this reciprocation, the conveyor 49 and the closed portion of the frame 36 move over the furnace as the cover 24 moves therefrom so that the area of the top of the furnace open to the atmosphere remains constant. For this purpose, the frame 36 of the conveyor is provided with laterally and downwardly extending flanges 36b along the sides thereof similar to the flanges 25 and 26 on the cover member 24. The flanges 36b likewise extend into the troughs 27 and 28 which are of sufficient length to cooperate with the mechanism throughout its movement.

The delivery of material from the conveyor 49 directly into the furnace, even with the aforementioned reciprocation of the conveyor, does not provide adequate distribution of the material due to the irregularity of delivery of material to the conveyor belt as well as other causes which need not here be discussed in detail. In accordance with this invention, however, suitable distribution of the material in the furnace is achieved by providing a transversely extending conveyor means 57 in the opening or space between the cover member 24 and conveyor 49 so that the material delivered from the latter is transversely distributed within the furnace 10. The conveyor means 57 is carried by the cover member 24 below the forward end of the conveyor or belt 49 and slightly forward thereof and receives at least a portion of the material delivered from the conveyor or belt 49. The width and speed of the conveyor 57 are such that the entire quantity of material delivered by the conveyor belt 49 is not retained thereon so that at least a part of this material can fall from either side of the conveyor 57 during operation of the latter. The amount of material thus falling therefrom can be varied by altering the space between the cover member 24 and the conveyor frame 36 by changing the points of connection of the straps 42 and 43. In addition, the conveyor 57 preferably is formed with spaced openings therethrough of dimensions such that broken particles or fines of the material being charged to the receptacle may pass therethrough while the larger particles or agglomerates cannot so pass, but are carried by the conveyor to a point adjacent the side walls of the furnace, it being observed from Fig. 2 that the length of the conveyor 57 is slightly less than the width of the furnace so that the material delivered from the ends of the conveyor 57 falls adjacent the longitudinal side walls of the furnace.

The conveyor 57 may be formed of suitable screening or the like but in the preferred embodiment the desired openings are provided by constructing the conveyor of spaced parallel rods or bars extending generally longitudinally of the apparatus and supported at their ends on suitable chains or other members running upon pulleys on the ends of spaced shafts 58 and 59. The shafts 58 and 59 are rotatably supported in hollow tubes or pipes such as 60, 61 which are mounted on the underside of the cover member 24 and extend longitudinally thereof. The ends of the shafts 58, 59 opposite the conveyor 57 are provided with a power drive which is here shown as comprising sprockets 62 and 63 on the ends of the shafts about which is trained a chain 64 that also extends about a drive sprocket 65 suitably supported upon the top of the cover member 24 adjacent the forward edge thereof which is remote from the conveying means 49. The sprocket 65 is operatively connected with a motor and speed reduction unit 66 supported upon the top of the cover member 24 adjacent the aforementioned forward edge thereof, so that the motor and speed reduction unit 66 are not subjected to the heat from the furnace during reciprocation or when the cover member is in its one extreme position as shown in Fig. 1.

The motor 66 is reversible and is controlled, as hereinafter described, to effect driving of the conveyor 57 in opposite directions for predetermined intervals of time which may be of the same or different durations. This control of the motor 66 may be either manually or automatically effected. It will be evident, however, that with either mode of control, the material delivered from the conveyor belt 49 will be distributed within the furnace 10 by the conveyor 57 as the mechanism is reciprocated over the furnace by operation of the motor 52. Thus, a portion of the larger fragments and whole bodies of this material will tend to fall from the sides of the conveyor 57 while the fines and fragments of the bodies fall through the openings between the bars of the conveyor and will be distributed by these bars. A large portion of the larger fragments and whole bodies will be carried by the conveyor to points adjacent the longitudinal side walls of the furnace with the depositing of this portion of the material being alternately effected adjacent the opposite side walls.

The material to be charged into the furnace is continuously supplied to the mechanism during reciprocation thereof by movement of the belt 49 beneath a material supplying means, generally designated 67, and which in the preferred embodiment comprises a conveyor belt 68. This belt carries the material, such as agglomerates, pellets, or the like, from a point of manufacture or supply to a location above the belt 49 which is of sufficient length so that the said pellets or other agglomerates are deposited thereon throughout the reciprocation of the mechanism over the furnace. The belt 68 may be driven by a suitable motor or other power means not shown and may be either directly supplied with the pellets or agglomerates or may in turn be supplied by other conveyor means as desired.

In view of the fact that the conveyor 49 is continuously supplied with material during reciprocation of the apparatus, means must be provided to maintain the weight of material per foot length of this conveyor substantially constant so that there will be uniform delivery of material to the furnace or other receptacle regardless of the direction of movement of the apparatus thereover. In accordance with this invention, this uniformity is achieved by automatically increasing the speed of the conveyor belt 49 by an amount equal to twice the speed of reciprocation of the entire apparatus when the latter begins to move to the right as viewed in the drawings and by automatically reducing the speed of the belt 49 to its original value when the apparatus moves to the left. By way of example but without limitation thereto, if the conveyor belt 49 travels at 60 ft./min. when the apparatus is moving to the left, as viewed in the drawings, and the speed of reciprocation is 30 ft./min., then the speed of belt 49 will be increased to 120 ft./min. when the apparatus is traveling in the opposite direction. Hence, the conveyor 49 always travels at the same speed in relation to the feeding means 67 regardless of the direction in which the entire apparatus is moving. Consequently, there will be a uniform weight of material per foot of length of the belt 49 so that there is uniformity of delivery of material to the furnace or other receptacle.

The conveyor belt 49 is also preferably reversible in its direction of running so that the material delivered thereto by the supply means 67 can be either fed to the furnace or returned to the source of supply. Thus, when the material supplied to the furnace is in the form of ball-like bodies of ore concentrates or the like and these should be unsatisfactorily formed, reversal of the direction of running of conveyor 49 will deliver such bodies over the rear end of the conveyor for return, by means not shown, to the ball-forming apparatus. Also, this feature enables feeding of the furnace to be temporarily stopped without the necessity of stopping the ball-forming apparatus.

Figure 5:
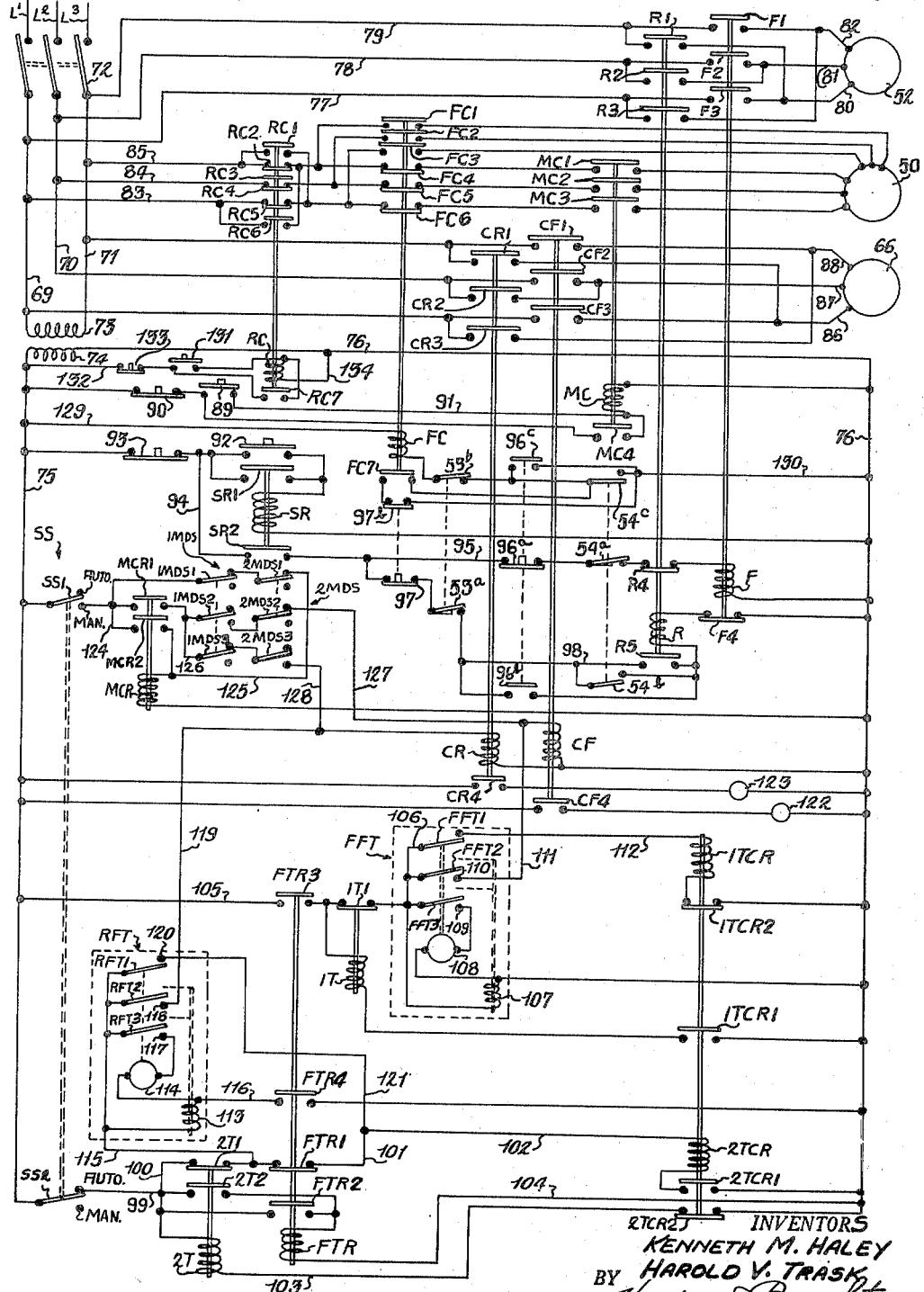
Fig. 5 is a simplified schematic electrical wiring diagram illustrating the control circuits for the motors of the apparatus.

Control of the mechanism is electrically effected by a motor control and energization circuit which is schematically represented in Fig. 5. As indicated therein, power for operating the apparatus is supplied from a suitable source of three-phase alternating current represented by the power supply lines L1, L2 and L3, which are adapted to be connected to the supply wires 69, 70 and 71 of the apparatus through a disconnect switch 72. The supply wires 69 and 71 are connected to the primary 73 of a transformer, the secondary 74 of which is connected to the supply wires 75 and 76 for the control circuit of the apparatus. The wires 69, 70 and 71 are connected, respectively, with wires 77, 78 and 79 which are adapted to be connected with the motor leads 80, 81 and 82 of the motor 52 by the contacts F1, F2 and F3 of a motor contactor F when the latter is energized, thereby effecting reciprocation of the mechanism in a forward direction. Motor 52 is energized for reverse rotation and hence reverse movement of the mechanism by energization of the reverse contactor R and deenergization of the forward contactor F. Energization of the reverse contactor R closes its contacts R1, R2 and R3 so that the motor leads 80 and 82 are reversed in their connections with the wires 77 and 79, while the wire 78 is again connected with the motor lead 81.

The motor 50 for operating the conveyor belt 49 is of the reversible variable speed type and may be of either the D. C. or A. C. type. For convenience of illustration, this motor is shown as a two speed alternating current motor of the reversible type which is energized through wires 83, 84 and 85 connected respectively with the wires 69, 70 and 71. Control of operation of this motor is effected by three contactors MC, FC and RC. When the contactor MC is energized and contactors FC and RC are deenergized, the motor is operated in a forward direction at its lower speed by connection of its low speed leads to the wires 85, 84 and 83 through the now closed contacts RC2, FC4, MC1, RC4, FC5, MC2, RC5, FC6 and MC3. When the reciprocation of the apparatus is reversed, as hereinafter described, the contactor FC is energized so that contacts FC1, FC2 and FC3 are closed connecting the wires 85, 84 and 83 to the high speed leads of motor 50. Simultaneously, the contacts FC4, FC5 and FC6 are opened breaking the circuit to the low speed leads. Reversal of the conveyor belt 49 is effected by energizing contactor RC thus closing contacts RC1, RC3, and RC6 while opening contacts RC2, RC4 and RC5. The closing of contacts RC1 and RC6, in effect, reverses the wires 83 and 85 so that the motor 50 is energized for reverse rotation at the speed determined by that set of leads which are then connected to the power supply, this in turn being determined by whether or not the FC contactor is energized.

The motor 66 for driving the distributing conveyor 57 is energized for rotation in a forward direction by energization of a motor contactor CF, which operates to close the contacts CF1, CF2 and CF3, thereby connecting the wires 69, 70 and 71 respectively with the motor leads 86, 87 and 88 of the motor 66. Deenergization of the motor contactor CF and energization of the motor contactor CR energizes the motor 66 for reverse rotation by virtue of closing of the contacts CR1, CR2 and CR3 of the contactor CR. This effects reversal of the motor leads 86 and 88, as will be readily understood, while the lead 87 remains connected with the power line 70.

Starting and stopping of the motor 50 are controlled, respectively, by manually actuated start switch 89 and stop switch 90 which are connected in series between the control circuit power supply wire 75 and a wire 91. The wire 91 is connected to one terminal of the coil for the motor contactor MC while the other terminal of this coil is connected to the power wire 76 of the control circuit. The contactor MC also has a contact MC4, which is connected in parallel with the normally open manual start switch 89 to provide a holding circuit for the contactor, thus maintaining the conveyor 49 in operation once it is started until the normally closed stop switch 90 is actuated.

Travel or reciprocation of the mechanism with automatic reversals thereof is under the control of a normally open, manually actuated start switch 92 and a normally closed, manually actuated stop switch 93 which are connected in series between the wire 75 of the control circuit and one terminal of a relay SR, the other terminal of this relay being connected to the wire 76 of the control circuit. Bridged about the start switch 92 is a contact SR1 of the relay SR so that automatic reciprocation of the mechanism may continue after the start switch 92 is released. The relay SR is also provided with a contact SR2 which is normally open but is adapted to close a circuit from a point between the switches 92 and 93 through wires 94 and 95, contact 96a of a manually actuated reversing switch, the normally closed contact 54a of the limit switch 54, the normally closed contact R4 of contactor R, and the coil of contactor F which is connected to the control wire 76. Between the contacts SR2 and 96a is connected a circuit extending in series through a manually actuated, normally closed switch 97, normally closed contact 53a of limit switch 53, wire 98, the normally open contact R5 of contactor R and the coil of the contactor R, the circuit being completed to the wire 76 through the normally closed contact F4 of the contactor F. Connected in parallel about the contact R5 is the normally open contact 54b of limit switch 54 and connected in parallel about both contacts R5 and 54b is the contact 96b of the manually actuated reversing switch.

As mentioned heretofore, the duration of operation of the conveyor 57 in either direction of its travel may be either manually or automatically controlled. Selection of the desired mode of control is effected by a manually actuated switch having contacts SS1 and SS2 connected for actuation together between either of two positions designated "Auto" and "Man.," respectively. In the circuit as shown in Fig. 5, this switch is set for automatic operation and hence contact SS1 is in a position which opens the circuit therethrough, while contact SS2 is in position which closes the circuit therethrough. This latter circuit extends from wire 75 through the contact SS2, wires 99 and 100, the normally closed contacts 2T1 and FTR1 of timing relay 2T and feed control relay FTR, respectively, and wires 101, 102 to one terminal of a timing control relay 2TCR, the other terminal of which is connectible through the normally open contact 2TCR1 of this relay to the control circuit power supply wire 76. The coil of timing relay 2T is connected between the wires 100 and 103 with the latter connected through the normally closed contact 2TCR2 to the wire 76. The coil of relay FTR is adapted to be connected with the wires 99 and 100 through closing of the normally open contact 2T2 of relay 2T, which is connected between the wire 100 and one terminal of the coil for relay FTR, the other terminal of the latter coil being connected by the wire 104 to the power supply wire 76 of the control circuit. The relay FTR has a normally open contact FTR2 which, when closed, provides a holding circuit for the FTR relay since this contact is bridged about the contact 2T2.

A wire 105 is connected with the power supply wire 75 for the control circuit and this wire is adapted to be connected with a coil of a timing relay 1T through closing of the normally open contact FTR3 of relay FTR. The other terminal of coil 1T is connectible with the wire 76 through closing of the normally open contact 1TCR1 of relay 1TCR. Upon closing of the contact FTR3, a circuit is also completed through the latter and through the normally closed contact 1T1 to a wire 106 of a motor driven timing mechanism FFT. This timing mechanism is conventional and comprises a motor adapted to drive a cam or the like for actuation of the contacts FFT1, FFT2 and FFT3 after a predetermined time interval, which interval is adjustable from 0 to 120 seconds. The shaft of the motor of this timer is provided with a clutch electrically operated by a solenoid 107 which, when energized, is adapted to close the contacts FFT2 and FFT3. These contacts are opened as aforementioned after the predetermined time interval for which the timer has been set by operation of the motor 108 and simultaneously the contact FFT1 is moved to circuit closing position.

Timers of this nature may be purchased upon the open market and hence the details thereof need not here be described. It is sufficient to note that one terminal of the clutch solenoid 107 of this timer is connected with the wire 106, the other terminal of this solenoid being connected to the power wire 76 of the control circuit and to one terminal of the motor 108. The other terminal of the motor 108 is connected with a contact 109 which is adapted to be engaged by the contact FFT3 when the latter is actuated by the clutch solenoid. The contact FFT2 is adapted to engage a contact 110 when the clutch solenoid 107 is energized, thus completing the circuit through the latter and a wire 111 to one terminal of the coil of contactor CF which has its other terminal connected to the control wire 76. The contact FFT1 is adapted, when moved to circuit closing position, to complete a circuit from the wire 106 to the wire 112, which is connected with one terminal of the coil for relay 1TCR, the other terminal of this relay being connected through the normally closed contact 1TCR2 to the wire 76.

The circuit is also provided with a second motor driven timing mechanism RFT which is identical to the timing mechanism FFT and is likewise provided with a clutch operating solenoid 113 and a motor 114 for actuating the contacts RFT1, RFT2 and RFT3 in the same manner as the contacts FFT1 and FFT2 and FFT3 are actuated by the clutch 107 and motor 108 of the timer FFT. The movable contacts RFT1, RFT2 and RFT3 are each connected with a wire 115 which, in turn, is connected intermediate the contacts 2T1 and FTR1. The clutch solenoid 113 is connected between the wires 115 and a wire 116 which is adapted to be connected with the control power supply wire 76 upon closing of the normally open contact FTR4 of relay FTR. The motor 114 has one terminal thereof connected to the wire 116 and the other terminal connected to the contact 117 which is adapted to be engaged by the contact RFT3 when the clutch solenoid 113 is energized. The contact RFT2 is adapted to engage a contact 118 when the clutch solenoid 113 of the timer RFT is energized, thus completing a circuit from the wire 115 to a wire 119 which is connected with one terminal of the contactor CR, the other terminal of the latter being connected to the wire 76. The contact RFT1, when moved to circuit closing position, engages a contact 120 which is connected by a wire 121 to the previously mentioned wire 102 and hence completes a circuit through the latter to the coil of the relay 2TCR.

The relay coils 1TCR and 2TCR are so connected that they are alternately energized and when either is energized it moves all of the contacts of both relays and the actuated contacts remain in the positions to which they have been moved until the other of the two coils is energized. Therefore, these relays have been illustrated as having their respective coils acting upon a single armature for effecting operation of the contacts 1TCR2, 1TCR1, 2TCR1 and 2TCR2.

In addition to the previously mentioned contacts, the contactors CF and CR are each provided with another normally open contact CF4 and CR4, respectively, connected in series with signal lamps 122 and 123, respectively. Hence, when the CF contactor is energized causing energization of the motor 66 for moving the distributing conveyor 57 in the forward direction, this is indicated by illumination of lamp 122 through closing of contact CF4. Likewise, when the contactor CR is energized for driving the distributing conveyor in the reverse direction, contact CR4 is closed thereby illuminating the lamp 123.

When the distributing conveyor 57 is to be operated under manual control, the selector switch is thrown to position the contact SS1 and SS2 in engagement with the contacts indicated "Man." This opens the aforementioned circuit through the contact SS2 and closes a circuit through the contact SS1 to a wire 124. The wire 124 is connected with the contact 1MDS1 of a manually actuated switch 1MDS for controlling the distributing conveyor. This switch is of the two position type and comprises in addition to the contact 1MDS1, contacts 1MDS2 and 1MDS3 which are interconnected for simultaneous operation. With the contact 1MDS1 in the position shown in Fig. 5, a circuit is completed through the latter to a contact 2MDS1 of a second manually actuated control switch 2MDS for the distributing conveyor. This switch is likewise provided with three contacts operating together, these contacts being the aforementioned 2MDS1 and the contacts 2MDS2 and 2MDS3. With the contact 2MDS1 in the position shown in Fig. 5 a circuit is completed through the latter to a wire 125 connected with one terminal of a relay MCR, the other terminal of which is connected with the power supply line 76 for the control circuit.

The relay MCR is provided with two normally open contacts MCR1 and MCR2. Contact MCR2 is adapted, when closed, to complete a circuit therethrough from the wire 124 to the wire 125, thus providing a holding circuit for the relay MCR. The contact MCR1 is adapted, when closed, to complete a circuit from the wire 124 to a wire 126 which is connected with the contacts 1MDS2 and 1MDS3. In the position of the contacts shown in Fig. 5, contact 1MDS2 is in open circuit relationship. However, when the switch 1MDS is moved to its other position and the switch 2MDS is allowed to remain in its illustrated position, a circuit is completed from the wire 126 through contact 1MDS2 and contact 2MDS2 to a wire 127 connected with the wire 111 and hence to one terminal of the energizing coil for the contactor CF. The contact 1MDS3, in the position of the contacts shown in Fig. 5, completes a circuit from the wire 126 to the contact 2MDS3 of switch 2MDS. However, at this time the contact 2MDS3 is in open circuit relationship. This latter contact is, however, adapted, when switch 2MDS is actuated to its other position, to be moved into engagement with a contact connected to a wire 128 that is, in turn, connected with the wire 119 and hence with the coil for the control relay CR.

In employing the apparatus with automatic reversals of the distributing conveyor 57, the operator places the apparatus in use by initially positioning the selector switch so that the contacts SS1 and SS2 are in engagement with the stationary contacts marked "Auto" in Fig. 5. He then actuates the start button 89 for placing the conveyor 49 in operation. Actuation of the start switch 89 closes a circuit therethrough and through the stop switch 90 energizing the coil of the motor contactor MC for the motor 50. Consequently, the contacts MC1 and MC2 and MC3 are closed, energizing motor 50 so that the conveyor 49 is placed in operation in a forward direction at its lower speed. Energization of the MC contactor also closes the contact MC4 providing a holding circuit for this contactor so that the motor 50 remains energized after the start switch 89 is released. The motor 50 and the conveyor 49 will therefore remain in operation until such time as the operator actuates the stop switch 90.

Reciprocation of the apparatus is begun by actuation of the start switch 92. This completes a circuit through the stop switch 93 and the now actuated switch 92 to and through the coil of the SR relay, thus energizing the latter. Energization of the SR relay closes its contacts SR1 and SR2. The closing of the contact SR1 completes a circuit therethrough for the coil SR thus providing a holding circuit for energization of this coil so that the start switch 92 may be released after momentary actuation. Closing of the contact SR2 completes a circuit through the latter and wire 95, the normally closed contact 96a of the manual reversing switch, and the normally closed contact 54a of limit switch 54, to and through contact R4 of the contactor R and the coil of the forward contactor F, energizing the latter. Energization of the F contactor closes its contacts F1, F2 and F3 and opens its contact F4. Closing of the contacts F1, F2 and F3 energizes the motor 52 for rotation in a direction which causes movement of the cover member 24 and conveyor 49 in the forward direction; that is, to the left as viewed in Fig. 1. Opening of the contact F4 prevents inadvertent operation of the contactor R so that there can be no damage to the mechanism if an attempt is made to reverse the motor 52 while it is moving in the forward direction.

The mechanism will continue to move in the forward direction so long as the F contactor remains energized and hence will move forwardly until the switch actuator 56 engages and operates the limit switch 54 at the extreme limit of the forward travel and at which time the distributing conveyor 57 will have moved from the position shown in Fig. 1 to a location adjacent the opposite end wall of the furnace. When the mechanism has reached this position and switch 54 is actuated as just mentioned, contact 54a will be opened and contacts 54b and 54c will be closed. Opening of contact 54a deenergizes the F contactor causing the latter to open its contacts F1, F2 and F3 and close its contact F4. Opening of the contacts F1, F2 and F3 deenergizes the motor 52 for rotation in the forward direction while closing of the contact F4 establishes a circuit through the latter and the coil of the R contactor which circuit continues through the now closed contact 54b and wire 98 to limit switch 53a, thence through switch 97 and the now closed contact SR2. Hence, the R contactor is now energized causing it to close its contacts R1, R2, R3 and R5 and open its contact R4. Closing the contacts R1, R2 and R3 now energizes the motor 52 for rotation in the reverse direction so that the cover 24 and conveyor 49 are now returned towards their initial positions, thus moving the distributing conveyor 57 back over the furnace to the position as shown in Fig. 1. Opening of the contact R4 is a safety precaution to prevent inadvertent operation of the forward contactor F during this reverse operation, while closing of the contact R5 provides a holding circuit for the R contactor about the contact 54b so that the R contactor remains energized after the switch actuator 56 has moved from engagement with switch 54.

As mentioned heretofore, the speed of the conveyor 49 is increased during this return movement of the apparatus. Thus, operation of the switch 54, as just mentioned, when the apparatus reaches its extreme left-hand position, closes contact 54c. This completes a circuit from wire 75 through wire 129, the coil of contactor FC, contact 53b of limit switch 53, and through the now closed contact 54c to wire 130 which is connected with the supply wire 76 of the control circuit. Consequently, the contactor FC is energized closing its contacts FC1, FC2, FC3 and FC7 and opening its contacts FC4, FC5 and FC6. Opening of the latter contacts breaks the circuit to the low speed leads of motor 50 while closing of contacts FC1, FC2 and FC3 completes the circuit to the high speed leads of that motor so that the speed of the belt 49 is increased. Closing of contact FC7 provides a holding circuit for the FC contactor about the contact 54c so that the motor 50 continues to operate at its higher speed after the apparatus has moved the switch actuator 56 from engagement with the limit switch 54.

When the mechanism has returned to the position shown in Fig. 1, the switch actuator 56 will have again engaged and operated the switch 53, opening the contact 53a of the latter so that the R contactor is now deenergized restoring its contacts to their positions as shown in Fig. 5, thereby deenergizing motor 52 in its reverse direction of travel and reestablishing the circuit through the now closed R4 contact for the energization of motor 52 in the forward direction. Actuation of switch 53 has also opened its contact 53b breaking the holding circuit for the contactor FC thus deenergizing the latter restoring its contacts to the positions shown in Fig. 5. Hence, motor 50 is again energized for operation at its lower speed. When the mechanism begins to move forwardly, contact 53a of limit switch 53 closes, but the energizing circuit for the R contactor is held open at contact F4 until contactor F is deenergized by actuation of limit switch 54. Therefore, the apparatus will travel forward and back over the furnace so long as the SR relay remains energized and the speed of conveyor belt 49 will be automatically varied in accordance with the direction of travel.

Reciprocation of the apparatus may, however, be stopped at any desired time by momentarily operating stop switch 93, thereby breaking the circuit to the SR relay deenergizing the latter so that the circuit to the F and the R contactors is opened preventing energization of the travel motor 52. Resumption of reciprocation of the apparatus can again be initiated by momentary actuation of the start switch 92. In the event it is desired to reverse the direction of reciprocation of the apparatus, while it is in motion, either switch 96 or switch 97 may be actuated depending upon the direction in which the apparatus is then moving. Thus, if the apparatus is moving in the forward direction, that is, to the left as viewed in Fig. 1, and it is desired to reverse the travel before the distributing conveyor has reached its extreme forward position, this reversal can be effected by momentarily operating switch 96, thereby opening contact 96a and closing contacts 96b and 96c. The opening of contact 96a interrupts the circuit to the F contactor, deenergizing the latter and thus terminating rotation of the travel motor 52 in the forward direction. Closing of the contact 96b completes a circuit therethrough energizing the R contactor so that the motor 52 is now energized for rotation in the reverse direction. Closing of contact 96c completes a circuit therethrough energizing contactor FC so that the motor 50 is energized for operation at its higher speed thus increasing the speed of conveyor 49 as has been heretofore explained. The apparatus will then move in this new direction and automatically reverse its direction again with accompanying change in the speed of conveyor 49 when the extreme limit of travel has been reached, unless the operation is sooner interrupted by actuation of one of the manual switches.

In the event the apparatus is moving in the reverse direction, that is, from the position opposite that shown in Fig. 1 and back towards the illustrated position, reversal can be manually effected by momentary actuation of switch 97 thereby causing the apparatus to again travel in the forward direction. Momentary actuation of switch 97 breaks the circuit therethrough for the energization of the R contactor, thus deenergizing the latter so that the circuit providing reverse energization of motor 52 is opened. This deenergization of the R contactor also causes closing of the contact R4 establishing the circuit therethrough for energization of the F contactor with the result that the motor 52 will now be energized for rotation in the forward direction and the apparatus will now move in that direction. Actuation of switch 97 has also opened its contact 97b in the holding circuit for the FC contactor, which will have been energized since the apparatus was previously moving in the reverse direction. Hence, the contactor FC is deenergized so that the motor 50 is now energized for rotation at its lower speed thus reducing the speed of conveyor 49. When the apparatus reaches the limit of its movement in this direction limit switch 54 will be actuated and automatic reversals will thereafter occur at the limits of travel as before mentioned. It will be evident, therefore, that the apparatus of this invention may be caused to automatically change its direction of movement at either extreme thereof without attention from the operator or, if desired, the apparatus may be reversed in its travel at any point thereof by simply manually actuating the suitable switch 96 or 97.

As mentioned heretofore, the "manual-automatic" selector switch for the distributing conveyor was initially actuated to close the contact SS2 to the position shown in Fig. 5. This establishes a circuit therethrough and through the wires 99 and 100 to the coil 2T of the timing relay, the circuit for the latter being completed through the wire 103 and the normally closed contact 2TCR2. Consequently, relay 2T is energized, opening its contact 2T1 and closing its contact 2T2. Closing of the contact 2T2 completes a circuit therethrough, energizing the coil of the relay FTR so that the latter moves its contacts FTR2, FTR3 and FTR4 to closed position and contact FTR1 to open position. Closing of the contact FTR2 provides a holding circuit therethrough for the relay FTR so that the latter remains energized. Opening of the contact 2T1 prevents energization of the reverse motor driven timer RFT even though the contact FTR4 has been moved to closed position. Closing of the contact FTR3 completes a circuit therethrough and through the normally closed contact 1T1 to the wire 106 of the motor driven timer FFT. Consequently, the clutch solenoid 107 is energized and operates to close the contacts FFT2 and FFT3. Closing of the contact FFT3 completes a circuit therethrough from the wire 106 to a wire 111, thence through the coil of the contactor CF to the power supply line 76 for the control circuit.

Therefore, the CF contactor is energized closing its contacts CF1, CF2, CF3 and CF4. Closing of the contacts CF1, CF2 and CF3 energizes the motor 66 for driving the distributing conveyor 57 in its forward direction of movement, while closing of the contact CF4 completes a circuit energizing the lamp 122 so that a signal is provided that the distributing conveyor 57 is moving in its forward direction. Simultaneous with the beginning of the driving of the distributing conveyor in its forward direction, the closing of the FFT3 contact has energized the motor 108 of the timer FFT so that the period for which the timer has been set is begun. When this period of time has elapsed, the cam carried by the shaft of the timing motor 108 engages and operates the contacts FFT2 and FFT3 of the timer to open position and contact FFT1 to closed position. The opening of contact FFT2 deenergizes the CF contactor so that the distributing conveyor motor 66 is no longer energized for rotation in the forward direction and the lamp 122 is extinguished. Opening of the contact FFT3 interrupts the circuit therethrough to the motor 108 so that the latter is stopped. The movement of the contact FFT1 to circuit closing position completes a circuit from the wire 106 to the wire 112 momentarily energizing the relay 1TCR, this circuit being completed through contact 1TCR2. Consequently, the contact 1TCR2 is opened, contact 1TCR1 is closed, contact 2TCR1 is closed and contact 2TCR2 is opened. It will be remembered that the relays 1TCR, 2TCR are of the type which allow the contacts to remain in the positions to which they have been actuated by one coil until they are positively returned by operation of the other coil. Consequently, these contacts remain in the positions just mentioned even though opening of contact 1TCR2 breaks the energizing circuit for coil 1TCR. Moreover, although the circuit for the motor 108 of the timer FFT is interrupted by the cam actuated thereby, opening contact FFT3, it will be understood that there is sufficient additional movement of this cam after deenergization of the motor 108 to allow it to move the cam past the contacts sufficiently to allow return of the latter to their positions as shown in Fig. 5.

Closing of the contact 1TCR1 has energized the timing relay 1T so that the latter opens its contact 1T1 thereby deenergizing the clutch solenoid 107 and interrupting the circuit to the forward timer FFT. Opening of the contact 2TCR2 has broken the circuit therethrough for the timing relay 2T, thus deenergizing the latter. This relay being of the time delay type, however, does not immediately close its contact 2T1 and open its contact 2T2, but performs this operation only after the predetermined time interval for which it has been set. This is provided as a safety precaution to prevent energization of the distributing conveyor motor 66 in a reverse direction while it may still be coasting in a forward direction. When the timing relay 2T does operate its contacts, however, opening of the contact 2T2 does not result in deenergization of the FTR relay, since a holding circuit therefor has been provided by the contact FTR2. Closing of the contact 2T1 now establishes a circuit therethrough for energization of the reverse timer RFT. This circuit continues from the 2T1 contact to the wire 115, thence through the clutch solenoid 113, wire 116, and the now closed contact FTR4 to the power supply wire 76 for the control circuit.

Consequently, the clutch solenoid 113 is now energized and moves the contacts RFT2 and RFT3 to circuit closing positions, in addition to engaging the clutch of the timing unit. Closing of the contact RFT3 completes a circuit therethrough energizing the motor 114 of the timer, so that the timing interval is begun. The simultaneous closing of the RFT2 contact completes a circuit through the latter and the wire 119 to and through the coil of the CR contactor, energizing the latter. Energization of the CR contactor closes its contacts CR1 and CR2 and CR3, thus energizing the distributing conveyor motor 66 for rotation in the reverse direction with the result that the conveyor 57 is now moving in the direction opposite to that of its previous actuation. The contactor CR also closes its contact CR4 thus energizing the lamp 123 indicating that the distributing conveyor is now moving in the reverse direction.

When the predetermined time interval for which the reverse timer RFT has been set elapses, the motor 114 will have moved the cam or cams carried thereby into engagement with the contacts RFT1, RFT2 and RFT3 thereby moving the contacts RFT2 and RFT3 to circuit opening position while moving the contact RFT1 to circuit closing position. Opening of the contact RFT3 interrupts the circuit to the timing motor 114, while opening of the contact RFT2 breaks the circuit to the reverse controller CR so that the latter is deenergized thereby deenergizing the distributing motor 66 and extinguishing the lamp 123. Closing of the contact RFT1 completes a circuit through the wire 121 and the wire 102 to the coil 2TCR of the relay 2TCR, this circuit being completed through the now closed contact 2TCR1 of that relay. Consequently, the contact 1TCR1 and 2TCR1 are opened and contacts 1TCR2 and 2TCR2 are closed. Opening of the contact 2TCR1 breaks the circuit therethrough deenergizing the 2TCR relay. The contacts, however, remain in the position to which they have been actuated as previously described. Closing the contact 2TCR2 completes a circuit therethrough again energizing the 2T relay, so that the latter opens its contact 2T1 and closes its contact 2T2. Opening of the contact 2T1 terminates energization of the clutch solenoid 113 and prevents improper reenergization of the reverse timer RFT. Opening of the contact 1TCR1 breaks the circuit to the timing relay 1T, so that the latter is deenergized.

Relay 1T is of the time delay type and hence does not immediately close its contact 1T1 upon deenergization, but only after a predetermined time interval corresponding to that for which the timer has been set to operate. When this time interval has elapsed, however, contact 1T1 will again close completing a circuit through it and through the now closed contact FTR3 of the forward timer FFT as has been previously described. The 1T timing relay, like the 2T timing relay, is provided to prevent improper operation of the forward contactor while the distributing motor may be rotating in reverse direction as a result of the previous energization of the CR contactor.

The operation of the FFT timer to effect forward movement of the distributing conveyor 57 is the same as previously described. Hence, after the predetermined time interval for which the forward timer has been set has elapsed, the reverse timer RFT will again be energized to reverse the direction of travel of the distributing conveyor 57. This operation of automatic reversals of the distributing conveyor after predetermined time intervals continuously repeats without attention from the operator so long as the selector switch SS remains set as shown in Fig. 5.

The forward and reverse timers FFT and RFT are of adjustable duration and may be set to provide either the same or different time intervals. Thus, it may be found that in operating the furnace it is desirable to have a longer interval for movement of the distributing conveyor 57 in one direction than in the other. This may be readily effected by setting one timer for a longer period of operation than the interval of the other timer. By way of example, but without limitation thereto, the apparatus may be set for movement of the distributing conveyor in the forward direction during a time interval of 30 seconds while the reverse direction of movement occupies only 20 seconds. With the timers FFT and RFT set in this manner, these predetermined time intervals will be automatically repeated without attention from the operator. In normal operation, however, it has been found that successful operation can be achieved with the same time interval of the distributing conveyor in both directions, which interval is in the order of 24 seconds each.

Manual control of the duration of operation of the distributing conveyor 57 in either direction of movement and the time at which reversal occurs can be manually effected if desired. In this type of operation the selector switch SS is set so that the SS1 contact is in circuit closing position and the SS2 contact is in circuit opening position. Opening of the SS2 contact interrupts the previously described circuit for control of the forward and reverse timers FFT and RFT so that these units no longer have any effect upon the apparatus. The movement of the distributing conveyor 57 is now under control of the two manual switches 1MDS and 2MDS which actuate the contacts 1MDS1, 1MDS2, 1MDS3 and 2MDS1, 2MDS2, 2MDS3, respectively.

In initiating manual operation, both switches 1MDS and 2MDS must be set to the positions shown in Fig. 5. This completes a circuit from the wire 124 through the now closed contacts 1MDS1 and 2MDS1 to and through the wire 125 thus energizing the coil of the MCR relay. Energization of the MCR relay causes it to close its contacts MCR1 and MCR2. Closing of the contact MCR2 provides a holding circuit therethrough for the coil of the MCR relay, maintaining the latter energized even though the contacts 1MDS1 and 2MDS1 are later moved to circuit opening position. Closing of the contact MCR1 completes a circuit therethrough to the wire 126.

To operate the distributing conveyor 57 in a forward direction, the contact 1MDS2 is moved to circuit closing position which simultaneously opens the contact 1MDS1 and contact 1MDS3. The 2MDS switch is, however, left in the position shown in Fig. 5 so that a circuit is now completed through the now closed contact 1MDS2 and the contact 2MDS2 to the wire 127. Hence, the CF contactor is energized closing the contacts CF1, CF2, CF3 and CF4 so that the motor 66 is energized for rotation in the forward direction and the lamp 122 is energized indicating that the distributing conveyor is now moving in the forward direction. Movement of the distributing conveyor 57 in this direction will continue so long as the switches 1MDS and 2MDS are left in the positions just mentioned. If it is now desired to stop the distributing conveyor, this may be effected by moving either of these two switches to the circuit opening position intermediate the two sets of stationary contacts.

In the event it is desired to reverse the direction of the travel for the distributing conveyor 57, the 1MDS switch is moved to the position shown in Fig. 5, while the 2MDS switch is moved to the opposite position from that shown in Fig. 5. This positioning of the switches will break the previously described circuit for the CF contactor, deenergizing the latter. Simultaneously, or shortly thereafter, the contact 2MDS3 will be moved into engagement with the stationary contact connected with the wire 128. Consequently, a circuit is now completed through the contacts 1MDS3 and 2MDS3 for energization of the CR contactor with the result that the contacts CR1, CR2, CR3 and CR4 are closed. Closing of the contacts CR1, CR2 and CR3 energizes the motor 66 for moving the distributing conveyor 57 in the reverse direction, while closing of the contact CR4 illuminates lamp 123 indicating that the distributing conveyor is now moving in this reverse direction. The travel of the distributing conveyor in this direction will continue so long as the switches 1MDS and 2MDS remain in their positions just mentioned. When it is desired to stop the conveyor, this may be effected by opening one or the other of the switches. If it is again desired to have the distributing conveyor move in its forward direction this is effected by reversing the positions of the switches.

Consequently, it will now be apparent that the distributing conveyor 57 may be caused to travel in either direction for any desired period of time under manual control. When it is desired to terminate manual control and again initiate automatic timing of the distributing conveyor operation, the selector switch SS is again actuated to its automatic position. This opens the contact SS1 and closes the contact SS2. Opening of the contact SS1 deenergizes the MCR relay so that the latter opens its contacts MCR1 and MCR2 thus preventing the switches 1MDS and 2MDS from exercising any further control of the contactors CF or CR. Closing of the contact SS2 reestablishes the circuit through the wire 99 to the timing motors for automatic control of the travel of the distributing conveyor as will now be apparent.

In the event it is desired to dispose of material from the supplying means 67 other than by feeding to the furnace, as for example, returning of inferior ball-like bodies to the ball forming mechanism, this may be effected by momentarily actuating a manual switch 131. This completes a circuit from supply wire 75 through wire 132, a normally closed manual switch 133 and the now closed switch 131 to one terminal of the coil for a contactor RC, the circuit being completed through wire 134 to the other power supply wire 76 of the control circuit. Hence, contactor RC is energized thereby closing its contacts RC1, RC3, RC6, RC7 and opening its contacts RC2, RC4 and RC5. Closing of contact RC7 provides a holding circuit for the RC contactor about switch 131 so that the contactor remains energized after the switch is opened. Closing of contacts RC1, RC6 and opening of contacts RC2, RC5 reverses the connections of wires 83 and 85 in the circuit of motor 50 while the opening of contact RC4 and closing of contact RC3 retains the connection of the motor to wire 84. Hence, the direction of rotation of motor 50 is reversed and operates at either its high or low speed depending upon whether or not the FC contactor is energized. Therefore, the conveyor belt 49 now delivers the material over the rear end thereof to conveying means not shown. When it is desired to resume forward operation of the conveyor 49, switch 133 is actuated thus deenergizing the contactor RC so that its contacts return to the positions shown in Fig. 5 again energizing the motor 50 for rotation in the forward direction.

In brief summary of the above, the operation of the machine comprises initiating movement of the conveyor 49 by energization of its motor 50 through actuation of the switch 89. The interval timers for the distributing conveyor 57 are then set to the predetermined times for operation of this conveyor in its forward and reverse directions, respectively, and the operation is initiated by closing the selector switch SS to its automatic position. Travel of the apparatus in its reciprocation over the furnace is initiated by actuation of the start switch 92. Consequently, with material being supplied to the apparatus from the conveyor 67, this material will fall upon the conveyor belt 49 as it moves beneath the conveyor 67 and the conveyor 49 will carry this material forwardly onto the distributing conveyor 57. The material thus delivered to the distributing conveyor will be transversely distributed within the furnace while the apparatus is longitudinally reciprocating thereover through automatic operation of the travel motor 52, and the speed of conveyor belt will be automatically varied in accordance with the direction of travel of the apparatus. Hence, the material will be distributed in the upper portion of the furnace in accordance with the pattern which has been found most advantageous for control of the furnace operation.

In the normal operation of the apparatus, the fines which fall between the separate bars or rods of the distributing conveyor 57 are distributed over the furnace both laterally and longitudinally by impinging upon the bars of the conveyor 57 as the said fine particles move therebetween and by the longitudinal travel of the apparatus as a whole. The larger pellets or particles are in part carried adjacent the side walls of the furnace by the automatic reversals of the distributing conveyor 57 and in part fall centrally of the furnace since, as has been mentioned heretofore, the width of the distributing conveyor 57 is less than sufficient to retain thereon the entire load of material delivered from the conveyor 49. Consequently, the larger particles or pellets are also distributed throughout the cross section of the furnace with the majority of the larger particles however being placed adjacent the side walls of the furnace. The proportions of the materials thus distributed may be varied by altering the speed of the motor for the distributing conveyor and by varying the gap or space between the cover 24 and the conveyor 49. This latter adjustment is readily effected by altering the distance between the conveyor 49 and cover car 24, it being remembered that the connecting straps 42 and 43 have openings at different points to facilitate adjusting of the said space. The distribution of material within the furnace may also be controlled by altering the time interval for operation of the distributing conveyor 57 in either its forward or reverse directions, or both, as conditions may require. Likewise, distribution within the furnace may be altered by manually controlling the points of reversal of the apparatus in its reciprocation, through selective manual operation of the reversing switches 96 or 97 and by manually controlling the distributing conveyor through switches SS, 1MDS and 2MDS.

Although the invention has been specifically described with respect to charging material in the form of pellets or agglomerates into a shaft furnace of substantially rectangular configuration, it will be apparent that the apparatus may be similarly employed for charging the same or other material into receptacles other than furnaces where similar problems are encountered, as, for example, into bins or storage tanks. Furthermore, variations may be made with respect to the details of construction of the apparatus as will be apparent to those skilled in the art. For example, although the motor 50 for driving the conveyor 49 has been disclosed as being of the two speed, reversible, alternating current type, it will be apparent a variable speed, reversible direct current motor may be substituted, in which event suitable changes would be made in the control circuit. Also, while a rod type conveyor formed of spaced members has been indicated as preferable for the distributing conveyor 57, it is not always necessary that this distributing conveyor be thus formed since it may be constructed of woven material or in some instances it need not have openings therethrough. It is also possible to employ for this conveyor spaced parallel longitudinally extending members rather than transversely extending members as, for example, a plurality of V-belts or the like might be employed under certain circumstances. These and other changes which may be effected in the apparatus without altering the principles of operation thereof are contemplated as coming within the skill of those working in the art and are therefore deemed included within the ambit of this invention so that the scope of the latter is not to be considered as limited to the specific details here shown and described except as may be required by the appended claims.

Having thus described the invention, we claim:

1. An apparatus of the character described for charging and distributing material into a receptacle comprising a supporting means adjacent to the receptacle to be charged, a reciprocable carriage mounted on said supporting means, a traveling conveyor means carried by the said carriage, means for reciprocating the said carriage whereby the said conveyor means will be reciprocated over the top of said receptacle, means for supplying material to said conveyor means during its reciprocation, a second conveyor means located within the confines of the receptacle, reciprocable mounting means for said second conveyor means whereby the said second conveyor means as an entity may be reciprocated across the top of said receptacle, means coordinating the supporting means of the first-mentioned conveyor and the supporting means for the second mentioned conveyor whereby they are reciprocated in unison, the said second conveyor means being mounted so that its travel is in a direction at right angles to the path of reciprocation of the carriage of the first-mentioned conveyor means, the discharge end of the first-mentioned conveyor means being positioned above and adjacent the second conveyor means whereby material will be discharged from the first conveyor means onto the second conveyor means, power means for driving the second mentioned conveyor in either direction, the speed of movement of the first-mentioned conveyor being coordinated with respect to the movement of the second-mentioned conveyor so that material will be discharged upon the second-mentioned conveyor in such quantities that part of the material discharged will fall from the sides of the second conveyor.

2. An apparatus of the character described for charging material into a receptacle comprising a first conveyor means reciprocable over the top of said receptacle, means supplying material to said conveyor means during its reciprocation, a second conveyor means, means supporting the second conveyor means so that it at all times extends transversely of the direction of travel of the said first conveyor means beneath the discharge end of the latter for reciprocation therewith over said receptacle, the said second conveyor means having openings therethrough permitting passage of bodies of the material smaller than a preselected size thereby effecting a spreading of portions of the said material while said second conveyor means is operating and being reciprocated, and power means for driving said second conveyor means in either direction transversely of its direction of movement with the first-mentioned conveyor means.

3. An apparatus of the character described for charging material into a receptacle comprising a reciprocable carriage a first conveyor means mounted upon said carriage whereby the said first conveyor is reciprocable over the top of said receptacle, means supplying material to said conveyor means during its reciprocation, a second conveyor means, means supporting the second conveyor means so that it at all times extends transversely of the direction of travel of the said first conveyor means beneath the discharge end of the latter for reciprocation therewith over said receptacle, coordinating means between the carriages mounting both of the above-mentioned conveyors whereby both are simultaneously reciprocated, reversible means for driving said second conveyor means in either direction transversely of its direction of movement with the first-mentioned conveyor means, and means for reversing the direction of driving of the second-mentioned conveyor means.

4. An apparatus as defined in claim 3 and further comprising timing means controlling the intervals of driving of the said second conveyor means in opposite directions.

5. An apparatus as defined in claim 3 and wherein the said means for driving the second-mentioned conveyor means comprises a reversible electric motor and the means for reversing the driving of said second conveyor comprises time controlled switch means operatively connected with said motor for controlling the energization thereof.

6. An apparatus as defined in claim 5 and further comprising manually operable switch means operatively connected to control energization of said reversible motor in either direction independently of said time controlled switch means.

7. An apparatus as defined in claim 3 and further comprising means to adjust the position of said second conveyor means relative to the discharge end of said first conveyor means without altering the angular relationship therebetween.

8. An apparatus of the character described for charging material into the top of a furnace comprising a cover member for the top of the furnace, means supporting said cover member for movement over the top of said furnace, a conveyor extending in the direction of movement of said cover member, means supporting said conveyor for movement as a unit with said cover member and with the delivery end of said conveyor spaced from said cover member to provide an opening therebetween extending transversely thereof, means for reciprocating said cover member and conveyor so that said opening travels over the top of said furnace, means for delivering material to said conveyor during reciprocation thereof, a second conveyor travelling in a direction transversely of the direction of movement of said cover member and of the first-mentioned conveyor, and means supporting the second-mentioned conveyor for movement with said cover member and the first-mentioned conveyor in a position at said opening adjacent the delivery end of the first-mentioned conveyor and in the path of material delivered from the latter thereby distributing the material in the said furnace.

9. An apparatus as defined in claim 8 and further comprising means for reversing the direction of travel of said second-mentioned conveyor means at predetermined intervals of time.

10. An apparatus of the character described for feeding material into the top of a furnace comprising a cover member for the top of the furnace, means supporting said cover member for movement transversely of the furnace over the top thereof, a belt-type conveyor extending in the direction of movement of said cover member, means supporting said conveyor for movement as a unit with said cover member and with the delivery end of said conveyor spaced from said cover member to provide an opening therebetween extending transversely thereof, means for reciprocating said cover member and conveyor so that said opening travels over the top of said furnace, means for delivering material to said conveyor during reciprocation thereof, a second conveyor travelling in a direction transversely of the direction of movement of said cover member and of the first-mentioned conveyor, and means supporting the second-mentioned conveyor for movement with said cover member and the first-mentioned conveyor in a position at said opening adjacent the delivery end of the first-mentioned conveyor for receiving material from the latter, the said second conveyor having openings permitting passage therethrough of bodies of the material smaller than a predetermined size and the width of said second conveyor being insufficient to retain thereon all of the material delivered thereto by said first conveyor, whereby the said smaller bodies and a portion of the larger bodies are delivered to the central portion of the furnace while the remainder of the material is delivered adjacent the side walls of the furnace.

11. An apparatus of the character described for feeding material into the top of a furnace comprising a cover member for the top of the furnace, means supporting said cover member for movement transversely of the furnace over the top thereof, a belt-type conveyor extending in the direction of movement of said cover member, means supporting said conveyor for movement as a unit with said cover member and with the delivery end of said conveyor spaced from said cover member to provide an opening therebetween extending transversely thereof, means for reciprocating said cover member and conveyor so that said opening travels over the top of said furnace, means for delivering material to said conveyor during reciprocation thereof, a second conveyor adapted to travel in a direction transversely of the direction of movement of said cover member and of the first-mentioned conveyor, means supporting the second-mentioned conveyor for movement with said cover member and the first-mentioned conveyor in a position at said opening adjacent the delivery end of the first-mentioned conveyor for receiving material from the latter, the said second conveyor having openings permitting passage therethrough of bodies of the material smaller than a predetermined size and the width of said second conveyor being insufficient to retain thereon all of the material delivered thereto by the first conveyor, and reversible driving means connected with said second conveyor for effecting travel thereof in either direction.

12. An apparatus as defined in claim 11 and further comprising means for automatically effecting reversal of said reversible driving means at predetermined intervals of time.

13. An apparatus as defined in claim 12 and wherein the said means for effecting reversal of the reversible driving means includes means for independently controlling the duration of operation of the driving means in each direction whereby the duration of the travel of said second conveyor in one direction may be the same or different than the duration of its travel in the opposite direction.

14. An apparatus as defined in claim 11 and further comprising means to adjust the position of said second conveyor relative to the delivery end of said first conveyor.

15. An apparatus of the character described for feeding material into the top of a furnace comprising a cover member for the top of the furnace, means supporting said cover member for movement transversely of the furnace over the top thereof, a belt-type conveyor extending in the direction of movement of said cover member, means supporting said conveyor for movement as a unit with said cover member and with the delivery end of said conveyor spaced from said cover member to provide an opening therebetween extending transversely thereof, means for reciprocating said cover member and conveyor so that said opening travels over the top of said furnace, means for delivering material to said conveyor during reciprocation thereof, a second conveyor adapted to travel in a direction transversely of the direction of movement of said cover member and of the first-mentioned conveyor, and means supporting the second-mentioned conveyor upon said cover member in a position at said opening adjacent the delivery end of the first-mentioned conveyor for receiving material from the latter, the said second conveyor having openings permitting passage therethrough of bodies of the material smaller than a predetermined size and the width of said second conveyor being insufficient to retain thereon all of the material delivered thereto by the first conveyor, means including a reversible drive motor connected with said second conveyor for effecting travel thereof in either direction, and time controlled switch means operatively connected with said motor to control the duration of energization of said motor for effecting travel of said second conveyor in either direction.

16. An apparatus as defined in claim 15 and further comprising manually operable switch means operative to control energization of said reversible motor for operating in either direction independently of said time controlled switch means.

17. An apparatus as defined in claim 15 and wherein the said motor is mounted upon the upper side of said cover member and spaced from said opening by substantially the length of said cover member whereby the said motor is protected from the heat of the furnace by said cover member and is not over said furnace during reciprocation of said cover member.

18. An apparatus as defined in claim 15 and further comprising means to adjust the amount of opening between the said cover member and the first-mentioned conveyor.

19. An apparatus of the character described for charging material into a receptacle comprising a power driven conveyor, means for reciprocating said conveyor over the top of said receptacle, means disposed at a fixed location above said conveyor for supplying material to the latter during its reciprocation, and means to automatically vary the speed of operation of said conveyor when the direction of its reciprocatory movement changes so that the load of material per unit length of said conveyor remains substantially constant throughout its reciprocation.

20. An apparatus of the character described for charging material into a receptacle comprising a power driven belt conveyor, means for bodily reciprocating said conveyor over the top of said receptacle, means disposed at a fixed location above said conveyor for supplying material to the latter during its reciprocation, and means to automatically increase the speed of driving of said conveyor by an amount substantially equal to twice the speed of its reciprocating movement when the said conveyor is bodily moved in the direction in which the portion of its length between the material supply means and the receptacle being charged is decreasing.

21. An apparatus as defined in claim 20 and further comprising means to reverse the direction of driving of said conveyor so that the material supplied thereto can be delivered to a location other than the said receptacle.

22. An apparatus of the character described for charging material into a receptable comprising a power driven belt conveyor, means for reciprocating said conveyor over the top of said receptacle, means disposed at a fixed location above said conveyor for supplying material thereto during its reciprocation, a second conveyor extending transversely of the direction of travel of the said first conveyor and supported beneath the discharge end of the latter for reciprocation therewith over said receptacle, power means for driving said second conveyor means in either direction transversely of its direction of movement with the first-mentioned conveyor, and means to automatically increase the speed of driving of said first conveyor by an amount substantially equal to twice the speed of its reciprocating movement when the said first conveyor is bodily moved in the direction in which the portion of its length between the material supply means and the receptacle being charged is decreasing.

23. An apparatus of the character described for feeding material into the top of a furnace comprising a cover member for the top of the furnace, means supporting said cover member for movement transversely of the furnace over the top thereof, a power driven belt-type conveyor extending in the direction of movement of said cover member, means supporting said conveyor for movement as a unit with said cover member and with the delivery end of said conveyor spaced from said cover member to provide an opening therebetween extending transversely thereof, means for reciprocating said cover member and conveyor so that said opening travels over the top of said furnace, means disposed at a fixed location above said conveyor for delivering material thereto during reciprocation thereof, a second conveyor adapted to travel in a direction transversely of the direction of movement of said cover member and of the first-mentioned conveyor, means supporting the second-mentioned conveyor upon said cover member in a position at said opening adjacent the delivery end of the first-mentioned conveyor for receiving material from the latter, means including a reversible drive motor connected with said second conveyor for effecting travel thereof in either direction, means operatively connected with said motor to control the duration of energization thereof for effecting travel of said second conveyor in either direction, and means to automatically increase the speed of the first-mentioned conveyor by an amount substantially equal to twice the speed of the reciprocating movement when the said first-mentioned conveyor is bodily moved in the direction in which the portion of its length between the material supply means and the furnace is decreasing.

References Cited in the file of this patent

UNITED STATES PATENTS

| | | |
|---|---|---|
| 1,056,738 | Catlett et al. | Mar. 18, 1913 |
| 2,219,954 | Geiger et al. | Oct. 29, 1940 |
| 2,277,416 | Rutten | Mar. 24, 1942 |
| 2,666,518 | Page, Jr. | Jan. 19, 1954 |